3,371,082
REACTIVE MONOAZO DYESTUFFS CONTAINING THE 2-FLUORO-BENZOTHIAZOLE GROUP
Angelo Mangini, Antonio Tundo, and Germana Mazzanti, Bologna, Italy, assignors to Aziende Colori Nazionali Affini ACNA S.p.A., Milan, Italy
No Drawing. Filed Dec. 15, 1964, Ser. No. 418,563
Claims priority, application Italy, Dec. 17, 1963, 25,884/63
5 Claims. (Cl. 260—158)

ABSTRACT OF THE DISCLOSURE

The invention relates to reactive monoazo dyestuffs containing the radical of 2-fluoro-benzothiazole-1 used in dyeing cellulose fibers in the cold in shades particularly fast to wet treatments.

Specification

Our present invention is an improvement over our co-pending application Ser. No. 337,541 of Jan. 14, 1964 and now abandoned and relates to reactive dyestuffs containing the radical of the 2-fluoro-benzothiazole-1:

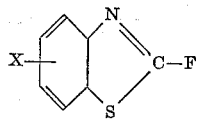

(I)

wherein X is (a) —N=N—R, R being the radical of an organic compound selected from the group consisting of sulphonated pyrazolone derivatives, sulphonated naphthols, sulphonated aminonaphthols and sulphonated naphthylamine derivatives; (b) —NH—Y—Ar, Ar being a colored residue of whatever type and Y=$SO_2$ or CO, as the reactive group.

These dyestuffs give dyeings particularly fast to wet treatments.

The practical possibility of applying reactive dyestuffs (I), containing the mobile fluorine in the 2-position of the benzothiazole nucleus and bound to a colored residue (chromophore), on the cellulose fibers could not be foreseen because of the different reactivity of fluorine in respect to chlorine in the benzothiazole nucleus.

The fluorine atom in the 2-position of the benzothiazole nucleus is much more mobile than the chlorine atom as shown by the respective reactions of the 2-chloro and 2-fluoro-benzothiazole with the methoxy and thiophenoxy ion respectively, at 25.0° C., in methanol. The kinetic constant for the reaction of the 2-fluoro-benzothiazole with the methoxy ion in methanol is 1000 times higher than the kinetic constant for the corresponding reaction of the 2-chloro-benzothiazole.

When reacting the two above-mentioned 2-halo-benzothiazoles with the thiophenoxy ion, always in methanol medium, the reaction kinetic constant of the 2-fluoro-benzothiazole is more than 5000 times higher than the reaction kinetic constant of the 2-chloro-benzothiazole.

From the point of view of their application, the reactive dyestuffs of the present invention, as compared to the reactive dyestuffs containing a chlorine atom in the 2-position of the benzothiazole nucleus, have the advantage of dyeing the cellulose fibers in cold, at a temperature of about 30° C., or in warm, at 75–80° C., according to the pH of the dye bath. In both cases, shades particularly fast to wet treatments are obtained.

The reactive dyestuffs of our present invention are prepared from 6-amino-2-fluoro-benzothiazole (II), which is obtained from 6-amino-2-chloro-benzothiazole (III) by exchange of the chlorine with anhydrous potassium fluoride according to the reaction

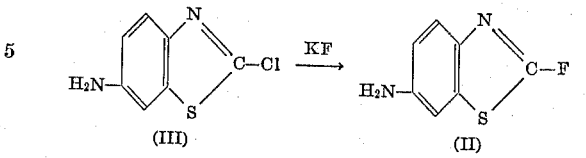

The 6-amino-2-fluoro-benzo-thiazole is successively diazotized and coupled with various coupling agents thus giving the dyestuffs (IV)

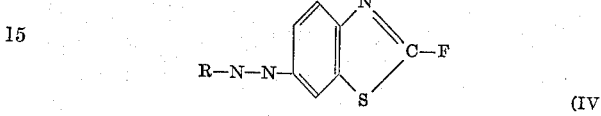

(IV)

wherein R is sulphonated pyrazolone derivatives, sulphonated naphthylamino derivatives, sulphonated naphthol derivatives, and sulphonated amino-naphthol derivatives.

The 6-amino-2-fluoro-benzothiazole can be directly treated with colored residues of the type AR—$SO_2$—Cl or Ar—CO—Cl thus giving, after elimination of a molecule of HCl (between the chlorine of the sulphonyl or of the carboxyl group and a hydrogen of the amino group), the dyestuffs V and VI respectively:

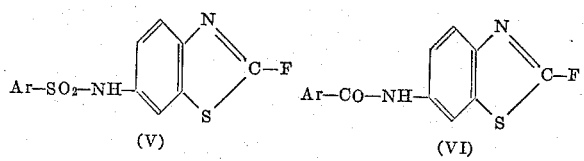

(V)                    (VI)

wherein Ar is a dye residue of any type.

The following examples are for the purpose of illustration only and not to limit the invention:

EXAMPLE 1

(a) *Preparation of the 6-amino-2-fluoro-benzothiazole*

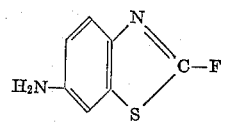

13.6 g. of anhydrous KF are suspended in 50 cc. of benzene which is then distilled to remove the last traces of moisture from KF. 50 cc. of dimethylformamide are then added and the whole is distilled until the distillate is obtained at 152° C. The whole is cooled, 11 g. of 2-chloro-6-aminobenzothiazole dissolved in 100 cc. of dimethylformamide are added and the whole is boiled, under agitation, for 20 hours. After the elimination by distillation of most of the dimethylformamide, the residue is poured into a water/ice mixture. The 2-fluoro-6-aminobenzothiazole is precipitated and collected by filtration.

(b) *Preparation of the dyestuff*

0.1 mol of the 2-fluoro-6-aminobenzothiazole is suspended in diluted HCl (0.4 mols) and diazotized with 0.1 mol of $NaNO_2$ at 0° C. The excess $NaNO_2$ is removed, the diazonium salt is then dropwise poured into the alkaline solution of the sulpho-phenyl-methylpyrazolone, taking care that the temperature does not exceed 3–5° C. and the pH remains between 8 and 8.5. After the addition of the diazonium salt, the whole is agitated again for 4–5 hours, the pH is adjusted to 7.5 and the whole is salted with NaCl. The dyestuff thus obtained dyes cotton, from an alkaline bath at 30°, in very fast yellow shade and has the formula

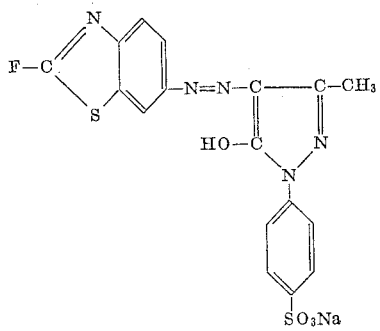

EXAMPLE 2

The diazonium salt obtained as described in Example 1, is coupled with the ureido of the isogamma acid; the dyestuff

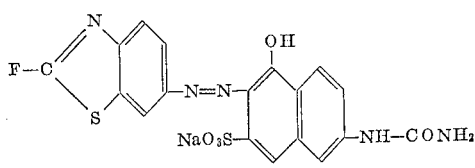

which dyes cotton at 30° C., from alkaline bath, in scarlet shade, is obtained.

EXAMPLE 3

The diazonium salt obtained as described in Example 1 is coupled with the H-acetyl acid; the dyestuff:

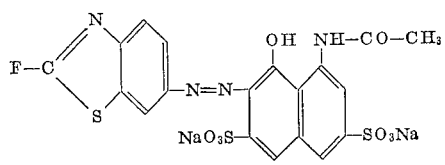

which dyes cotton, from alkaline bath at 30° C., violet, is obtained.

EXAMPLE 4

By coupling the diazonium salt of the 2-fluoro-6-aminobenzothiazole with the N-acetyl isogamma acid, the dyestuff:

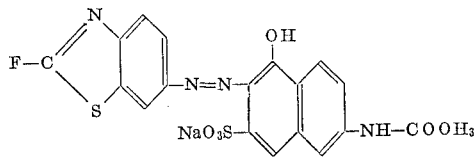

is obtained, which dyes cotton, from alkaline bath at 30° C., an orange-red shade.

EXAMPLE 5

By coupling the diazonium salt of the 2-fluoro-6-aminobenzothiazole with the urea-isogamma acid, the dyestuff:

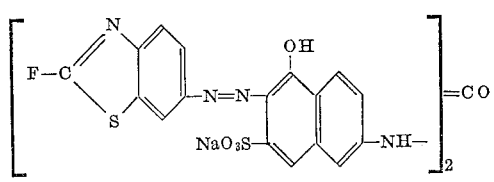

which dyes cotton from alkaline bath at 30° C. a scarlet shade very fast to wet treatments, is obtained.

EXAMPLE 6

The material to be dyed is placed into the dye bath at 30° C. The bath contains dissolved therein one or more of the dyestuffs exemplified. Sodium sulphate (30–40 g./l. dissolved in a little water) is then added divided in 2–3 doses and dyeing is carried out for 30–40 minutes. Successively and always working at 30° C., sodium hydroxide is added over 20 minutes until the pH of the dye bath is between 11 and 11.5. The dyeing is thereafter continued at 30° C. for an additional 90 minutes.

The fiber is removed from the dye bath and is washed first with warm water, then with hot water and finally with a boiling soap solution (0.5 g./l.). The dyeing thus obtained is fast to washing.

EXAMPLE 7

The purified material to be dyed is introduced into the dye bath at 50° C.; the bath contains dissolved therein one or more of the exemplified dyestuffs. After 10 minutes, the salt (sodium sulphate) (40–100 g./l.) is added over 30 minutes and divided in 3–4 doses while the bath temperature is raised up to 75° C.

After this time, the alkali ($Na_2CO_3$ 10 g./l.) is added, divided into 2 doses spaced 10 minutes apart. The dyeing is continued for 100 minutes longer.

The dye bath is then discharged and the fiber is first washed with warm water, then with hot water and finally with a soap solution (0.5 g./l.) for 15–30 minutes in order to remove from it the non-fixed dyestuff.

The dyeing thus obtained is fast to washing.

We claim:

1. Reactive dyestuff of the formula:

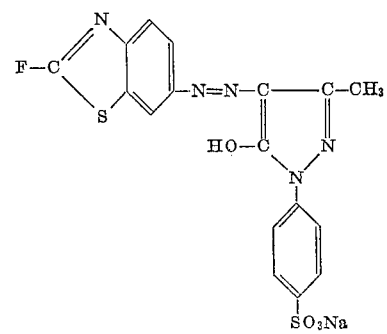

2. Reactive dyestuff of the structure:

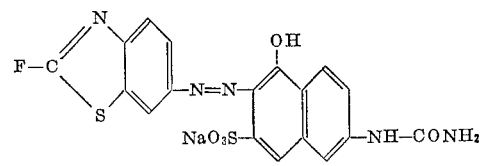

3. Reactive dyestuff of the structure:

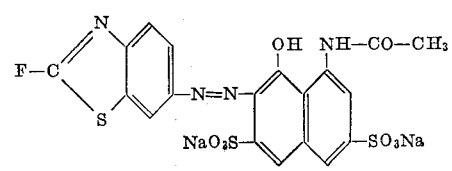

4. Reactive dyestuff of the formula:

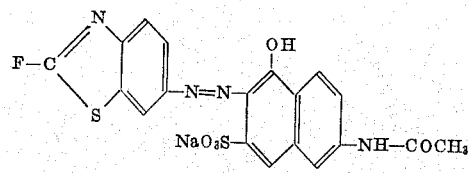

5. Reactive dyestuff of the formula:

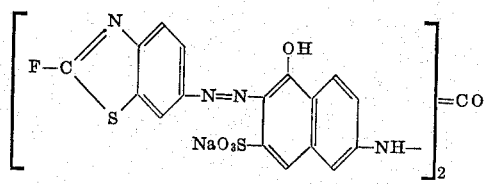

References Cited

UNITED STATES PATENTS

| | | | |
|---|---|---|---|
| 2,326,497 | 8/1943 | Riester et al. | 260—304 X |
| 3,034,891 | 5/1962 | Burgardt et al. | 260—304 X |
| 3,073,699 | 1/1963 | Firestine | 260—304 X |

FOREIGN PATENTS

| | | |
|---|---|---|
| Ad. 80,225 | 2/1963 | France. |
| 1,343,829 | 11/1963 | France. |

OTHER REFERENCES

Blomquist et al., J. Org. Chem., vol. 12, pp. 718–725 (1946).

Houben-Weyl, Methoden Der Organischen Chemis, vol. 5/3, pp. 160–166 (1962).

Lovelace et al., "Aliphatic Fluorine Compounds," p. 3 (1958).

FLOYD D. HIGEL, *Primary Examiner.*